United States Patent [19]

Yount

[11] Patent Number: 4,521,304

[45] Date of Patent: Jun. 4, 1985

[54] APPARATUS FOR BIODEGRADING ORGANIC WASTE

[75] Inventor: Gary L. Yount, Gettysburg, Pa.

[73] Assignee: Biocon, Inc., Gettysburg, Pa.

[21] Appl. No.: 374,273

[22] Filed: May 3, 1982

[51] Int. Cl.$^3$ .................. A47K 11/02; C02F 11/02
[52] U.S. Cl. .................................. 210/96.1; 210/143; 210/179; 210/251; 4/111.1; 4/DIG. 12
[58] Field of Search .................. 4/DIG. 12, 131, 111; 210/739, 96.1, 143, 179, 180, 150, 151, 177, 178, 206, 207, 208, 209, 219, 251

[56] References Cited

U.S. PATENT DOCUMENTS

| | | | |
|---|---|---|---|
| 3,859,672 | 1/1975 | Modig | 4/DIG. 12 |
| 3,959,829 | 6/1967 | Nordgren | 4/131 |
| 4,174,371 | 11/1979 | Bell et al. | 4/DIG. 12 |
| 4,263,135 | 4/1981 | Yeagley | 210/612 |

Primary Examiner—Thomas Wyse
Attorney, Agent, or Firm—Epstein & Edell

[57] ABSTRACT

A biological decomposition toilet automatically controls stirring of the mixture of organic waste and activating material as a function of the moisture content of the mixture. Rather than sensing mixture moisture content as a function of water vapor pressure above the mixture, the moisture sensor is disposed below the surface of the mixture, either in a specially-formed recess in the toilet wall or directly immersed in the mixture. A heater is disposed near the air inlet opening and is energized when the sensed moisture is above an exceedingly high moisture level so as to evaporate moisture from the incoming air. The stirrer mechanism includes plural motors and respective parallel spaced drive shafts having radial mixing prongs spaced longitudinally and axially along each shaft. Adjacent shafts are rotated in opposite directions. The prongs of any one shaft have equal lengths, but the prongs of adjacent shafts are of different lengths to encourage a serpentine circulation path for the mixture during stirring. Successive prongs are spaced at opposite angular directions so that alternate prongs along the shaft have uniform angular spacing.

25 Claims, 8 Drawing Figures

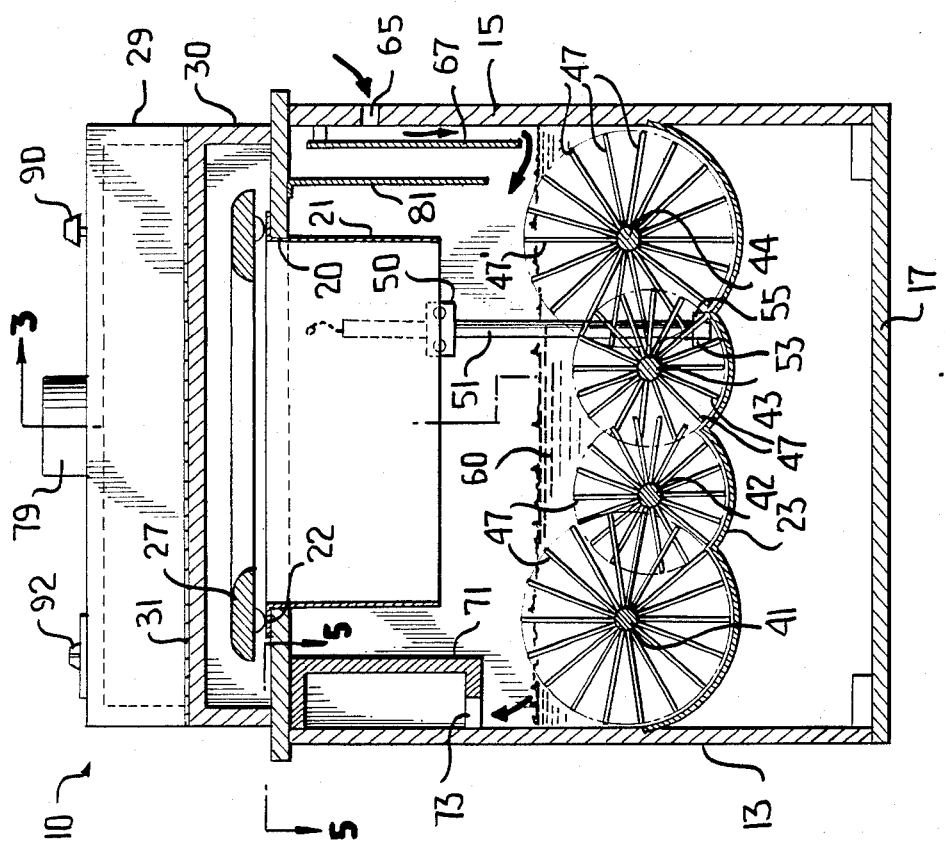
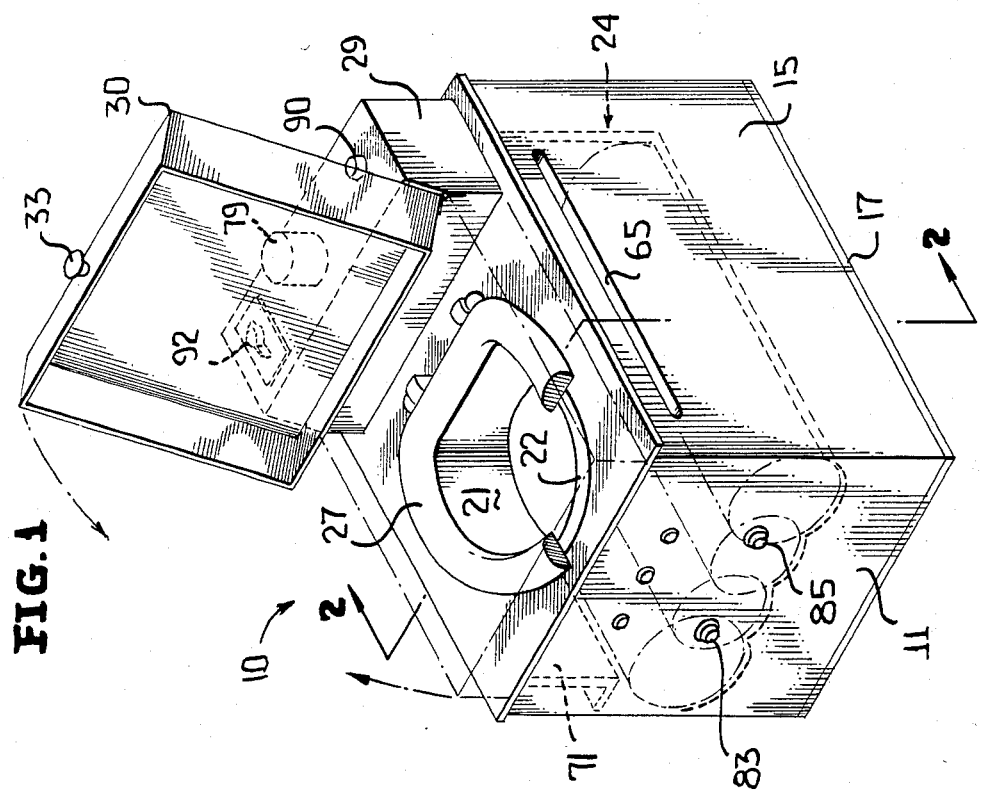

APPARATUS FOR BIODEGRADING ORGANIC WASTE

BACKGROUND OF THE INVENTION

1. Technical Field

The present invention relates to methods and apparatus for organic waste disposal. More particularly, the present invention relates to improvements in the biological decomposition of organic waste materials.

2. Prior Art

It will be recognized that conventional flush toilets are wasteful of precious water resources while simultaneously polluting those same resources. Consequently, there have been numerous prior art attempts to develop dry toilets, or toilets which dispose of organic waste without the need for water and without polluting the environment. The most promising approach, in this regard, has been the biological conversion toilet wherein aerobic conversion of organic waste to carbon dioxide, ammonia, and water is achieved by mixing the waste material with a bed of well known biological conversion activator materials. The primary problem facing most dry closets which have adapted this approach is the inability to completely aerobically decompose the waste material. The result is an odor emitted from the toilet which is too objectionable for home use or other such applications.

In U.S. Pat. No. 4,263,135 to Yeagley, there is described a recognition of the source of the problem in prior art toilets of this type. Specifically, it is described that prior art biological conversion toilets mix organic wastes with the bed of activator material for too short a period of time to achieve complete decomposition. Yeagley's invention involves maintaining the mixture of organic waste and activator material in a state of constant agitation or stirring, in the presence of oxygen, until the humidity in the vessel drops below a predetermined level. Yeagley vaguely relates this vessel humidity to the moisture in the mixture which he describes as being the primary parameter intended to control the stirring time. Specifically, good contact between air (oxygen), wastes and bacteria is not possible when the mix is too wet. The percentage of moisture in the bio-converting mix should be 40-60% for optimum speed of reaction. If too much moisture is present in the waste material, the excess water interferes with the contact between the waste material, the oxygen and the bacteria; however, adequate moisture must be present in order for the bacteria to properly function in the decomposition process.

It has been discovered, however, that the vessel or container humidity level is not necessarily a true measure of the moisture content in the mixture. For one thing, the temperature in the vessel has a greater effect on the humidity level above the mixture than in the mixture itself, so that humidity measurements must be compensated for temperature in order to be accurate. Further, the oxygen required for aerobic decomposition is supplied from the ambient environment surrounding the toilet by establishing an air flow through the vessel with an exhaust fan. The ambient air humidity will, therefore, have a significant effect on the humidity within the vessel and will, therefore, further distort any "fixed" relationship between the moisture content of the mixture and the humidity in the vessel. On the other hand, ambient air of high humidity tend to increase the moisture level in the mixture to an undesirable level.

Another important aspect of achieving complete decomposition of organic waste in toilets of the type described is the stirring or agitating action. More particularly, it is important that the entire mixture of activator material and waste material be caused to flow continuously and that stagnant or dead spots be avoided. In the device disclosed in the aforesaid Yeagley patent, stirring is effected by two auger members carried on spaced parallel drive shafts which are motor driven. The auger members of adjacent shafts do not transversely overlap; that is, there is a space between them which is not directly stirred. Moreover, plural augers are substantially identical in size and shape. The result is a tendency for stagnant or unstirred regions to develop in the mixture.

SUMMARY AND OBJECTS OF THE INVENTION

It is, therefore, an object of the present invention to provide a substantially odorless biological conversion toilet in which stirring action of the mixture of waste and activator material is directly controlled by the moisture content of the mixture itself rather than by the humidity in the air above the mixture.

It is another object of the present invention to provide a method for substantially completely biologically converting organic waste to carbon dioxide and water by controlling the stirring of a mixture of the waste and an activator material directly as a function of the moisture in the mixture.

It is still another object of the present invention to reduce excess moisture within a biological conversion toilet by de-humidifying incoming air as a function of the moisture content of the mixture of waste material and activator material in the toilet vessel.

Another object of the present invention is to provide a stirring technique for the mixture of waste material and activator material in a bio-conversion toilet such that no stagnant spots develop in the stirred mixture.

In accordance with the present invention, a biological conversion toilet has its stirring mechanism controlled by a moisture level sensor disposed below the level of the mixture of organic waste material and biological activation materials. The sensor may be immersed directly in the mixture or it may be disposed in a recess in the vessel wall disposed below the mixture surface. If the latter configuration is used, the senso life is extended by avoiding direct contact with the mixture material; however, the sensor detects the moisture in the mixture quite accurately because it is isolated by the mixture from the variants which affect the humidity above the mixture. A primary moisture sensor, disposed below the mixture surface, automatically turns off the stirring mechanism when the moisture level of the mix falls below a certain percentage, normally 40%. The temperature of the mixture is maintained in an optimal range by heating the bottom wall of the toilet vessel under thermostat control when stirring is occurring. An exhaust fan draws air through an inlet opening and into contact with the mixture.

In accordance with another aspect of the present invention, a secondary heater is provided for heating the incoming air at the inlet opening in order to de-humidify that air. The secondary heater is controlled by a second moisture sensor disposed below the mixture level so that if the moisture in the mixture is exceedingly high, on the order of 90%, the incoming air is dehumidified.

In another aspect of the present invention, the stirring mechanism of the bio-conversion toilet includes plural parallel motor-driven shafts with mixing prongs or fingers extending radially in overlapping relationship with the prongs of the adjacent shaft. The prongs disposed along each individual shaft are of the same length; however, the prongs of an adjacent shaft are of different length to enhance the stirring action. Successive prongs along the shaft length are angularly displaced, with alternate prongs being displaced in the same angular direction.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings:

FIG. 1 is a view in perspective of a biological conversion toilet constructed in accordance with the principles of the present invention;

FIG. 2 is a view in section taken along lines 2—2 of FIG. 1;

DESCRIPTION OF THE PREFERRED EMBODIMENTS

Figure 3:
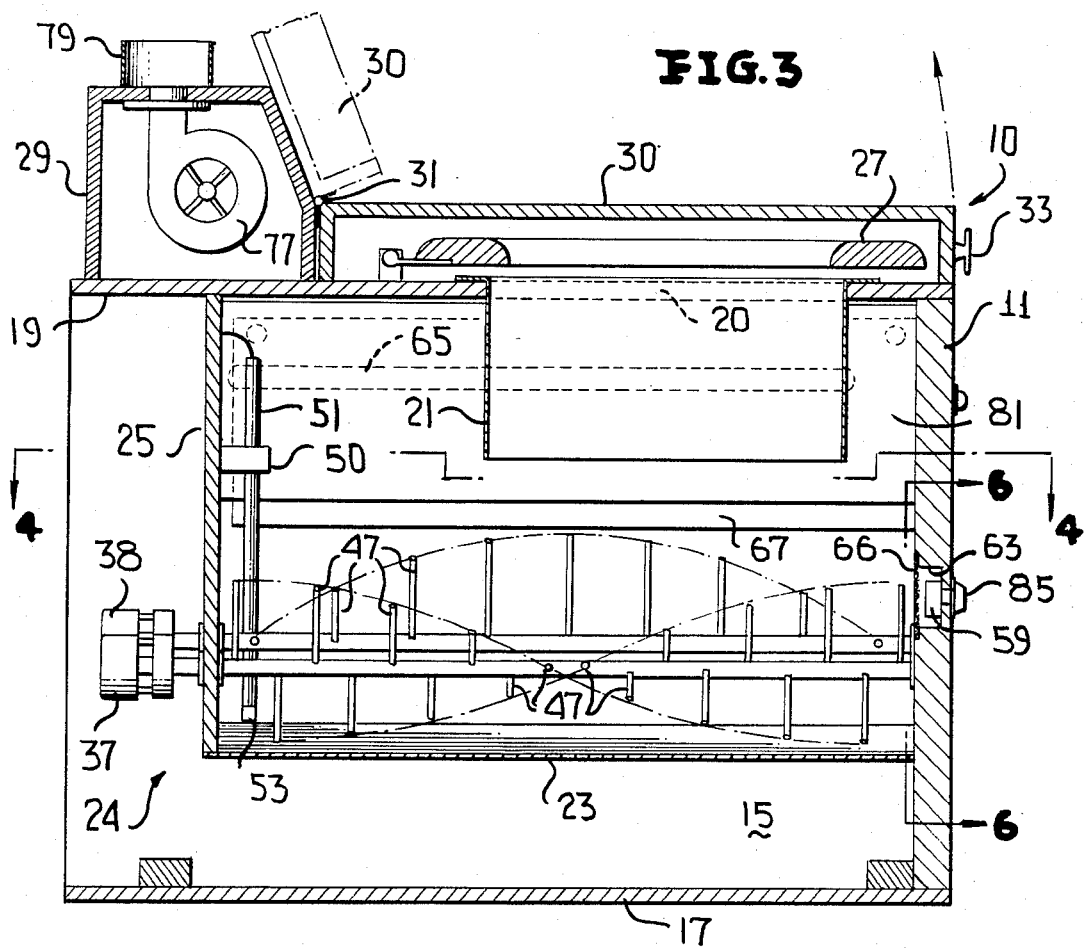
FIG. 3 is a view in section taken along lines 3—3 of FIG. 2.
Figure 4:
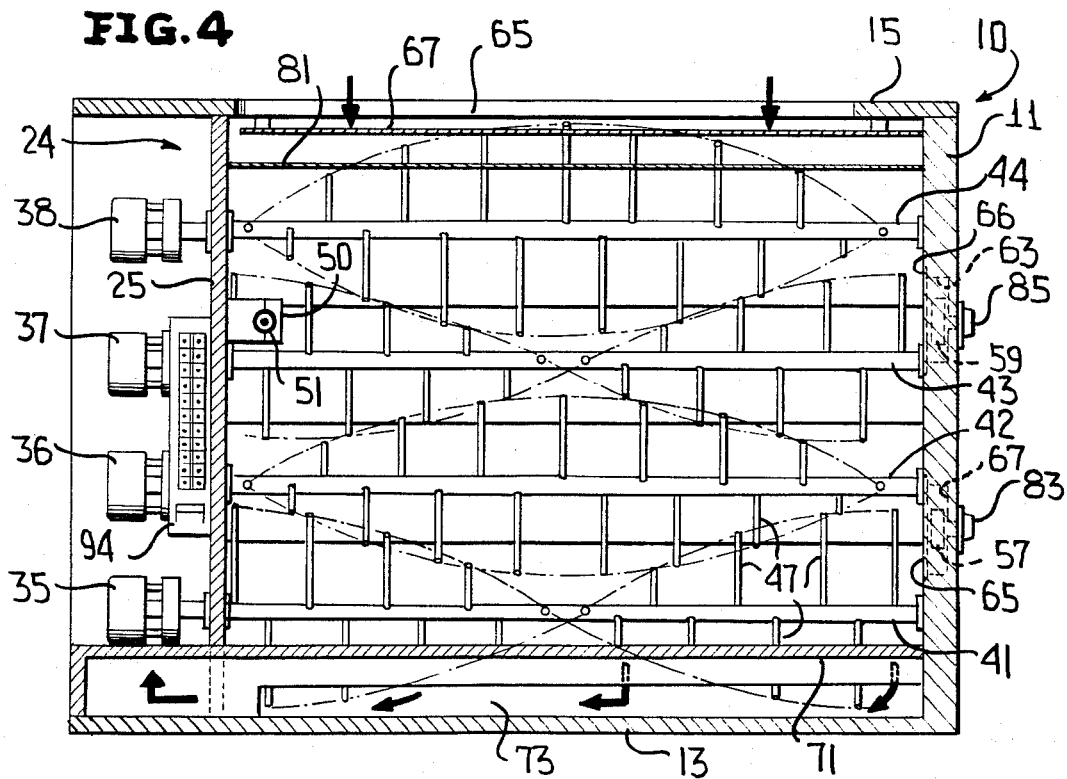
FIG. 4 is a view in section taken along lines 4—4 of FIG. 3.

Referring more specifically to FIGS. 1 through 6 of the accompanying drawings, a dry closet or toilet 10 according to the present invention includes a cabinet having a front wall 11, side walls 13 and 15, a bottom wall 17, and a top wall 19, all of which are of generally rectangular configuration. The rear of the cabinet is open, but may also be provided with a wall closure, if desired. The cabinet walls may be constructed of any material, such as wood, metal, plastic, etc. The preferred materials for the cabinet wall are molded polyethylene or fiber glass capable of withstanding temperatures from −80° F. to −220° F.

The top wall 19 of the cabinet is provided with a through hole or opening 20 of suitable perimetrical configuration and in which a splash guard 21 is positioned. Specifically, the splash guard 21 is provided with a lip 22 which extends radially outward from the top edge of the splash guard to a radius greater than that of the opening 21 so that the lip 22 supports the splash guard from the top surface of top wall 19 as the splash guard extends downwardly into the cabinet. The periphery of splash guard 21 substantially matches the configuration of opening 20. A composting compartment or vessel 24 is disposed immediately below opening 20 and the splash guard 21. The composting vessel 24 has its front defined by part of a cabinet front wall 11 and its sides defined by parts of side walls 13 and 15. The vessel 24 has a bottom wall 23, which is spaced above the cabinet bottom wall 17, and a rear wall 25, which extends between side walls 13 and 15 in its width dimension and between walls 19 and 23 in its height dimension. Rear wall 25 is located forwardly of the rearward edges of side walls 13 and 15.

An elevatable toilet seat 27 is pivotally mounted to the cabinet top wall 19 immediately rearward of opening 20 so as to be pivotally positionable over that opening for use. An exhaust fan housing 29 is secured to top wall 19 at a location rearward of toilet seat 27 and extends transversely across the cabinet. An elevatable box-like cover or lid 30 is adapted to selectively cover the entire portion of the top wall 19 located forwardly of housing 29, particularly the toilet seat 27 and opening 20. Lid 30 is pivotally secured to exhaust fan housing 29 by means of a piano hinge 31, or the like, in order to permit selective opening of the unit for use. A knob 33 or other handle is disposed at the front edge of lid 30 to facilitate pivoting of the lid.

Four electric motors 35, 36, 37, 38 are secured behind the vessel at substantially horizontally-spaced locations on rear vessel wall 25. Each motor has a respective parallel drive shaft 41, 42, 43, 44 which is journaled in vessel rear wall 25 and which extends depth-wise through the vessel so as to be journaled in front wall 11. Each drive shaft has a plurality of stirring prongs or fingers 47 extending radially therefrom. The prongs 47 which extend from outer shafts 41 and 44 are all of the same length and are longer than the prongs 47 extending from the inner shafts 42 and 43. The prong length is uniform for each shaft. Prongs 47 are uniformly spaced longitudinally along each shaft; that is, the longitudinal spacing between successive prongs is the same. Successive longitudinal prongs are also angularly spaced uniformly. More specifically, alternate prongs are spaced in opposite angular directions such that the distal end of alternate prongs define respective continuous smooth auger-shaped curves about their respective shafts, two paths per shaft being thusly formed by each set of alternate prongs. The angular spacing between alternate longitudinal prongs is selected to complete a 180° auger-shaped path. Therefore, if there are 18 prongs on a shaft, for example, the angular spacing between alternate prongs is 20°. The two auger-shaped paths extend in opposite directions so that the combination of the two paths covers 360°.

Adjacent pairs of shafts 41, 42, 43 and 44 are spaced by a distance which is less than the sum of the lengths of their repective prongs. In other words, the spacing between shafts 41 and 42 is less than the sum of the length of a prong 47 from shaft 41 and a prong 47 from shaft 42. This results in an overlap of the space between the shafts by the prongs when the shafts are rotated, thereby assuring complete stirring and continuous movement of material in the vessel. Interference between prongs 47 of adjacent shafts is avoided by longitudinally off-setting the prongs of each shaft with respect to prongs of the adjacent shaft so that, for example, prongs of shaft 41 fall longitudinally between the prongs of shaft 42.

A support bracket 50 is mounted inside the vessel on rear wall 25 at a location above the motors and shaft. Bracket 50 supports a rod 51 which extends downwardly along wall 25 to a level below shafts 41, 45. One or more moisturesensing probes 53 and a temperature-sensing probe 55 may be secured to the lower end of rod 51. Alternatively, the rod 51 may be used to support only a temperature sensor 55 at its lower end. Under the latter circumstances, moisture sensors 57, 59 are provided in respect of specially defined recesses 61, 63, in one of the vertical walls which define the composting vessel 24. In the illustrated embodiment, recesses 61, 63 are defined in front wall 11. Although the particular wall in which the recesses 61, 63 are defined is not of crucial importance, their depth in the composting vessel 24 is very important. Specifically, the recesses 61, 63 must be at a level which permits the moisture sensors 57, 59, respectively, to be disposed below the level of the mixture 60 of activating composting material and organic waste disposed in the vessel. In this manner, the moisture sensors can be used to sense the moisture content of the mixture 60 rather than the humidity above the surface of the mixture. This same function is performed by moisture sensors 53 which are immersed directly in the mixture. However, moisture sensors 57, 59 can be isolated from any direct contact with mixture 60 by placing moisture-pervious sheets 65, 67 of nylon or similar material over the open sides of recesses 61, 63, respectively. Maintenance requirements of moisture sensors 57, 59 can thereby be reduced and their useful lives extended.

The bottom wall 23 of vessel 24 may form an electrical resistance heater. Alternatively, the bottom wall 23 may be made of a suitable metal, such as a stainless steel, and heated by means of a suitable electric heater. For purposes of the invention described herein, it is assumed that the bottom wall 23 is part of the heater apparatus. In either case, the resulting heater is the primary heater for the unit and controls the temperature of mixture 60 in accordance with the operation described hereinbelow in relation to FIG. 7.

The mixture 60 is made up primarily of a suitable activating composting material of the type which is well known in the art. The preferred constituents for the material in the present invention are screened, moistened peat moss, nonsterilized potting soil and dried animal blood. In use, the material is mixed with organic waste, such as urine, feces, etc.

An air inlet for the vessel takes the form of a horizontally-elongated slot 65 defined in side wall 15 at a level considerably above the surface of mixture 60. A secondary heater for the unit takes the form of an electrical heater plate 67 secured to the inside surface of side wall 15 and in spaced relationship from air inlet slot 65 to define a flow path for the incoming air (as shown by arrows in FIGS. 2, 4) between the heater plate 67 and wall 15. When the heater plate is energized, air flowing therealong is heated and, as a result, is dehumidified before flowing further into the vessel and in contact with mixture 60.

Figure 5:
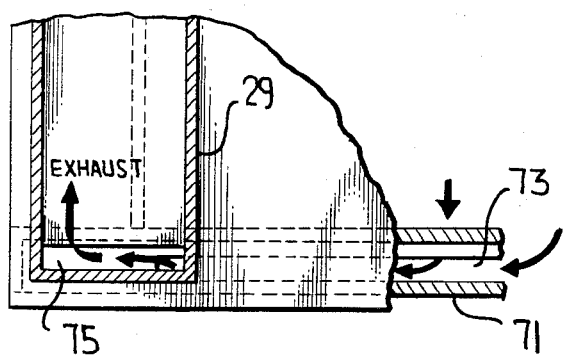
FIG. 5 is a detailed view in section taken along lines 5—5 of FIG. 2.
Figure 6:
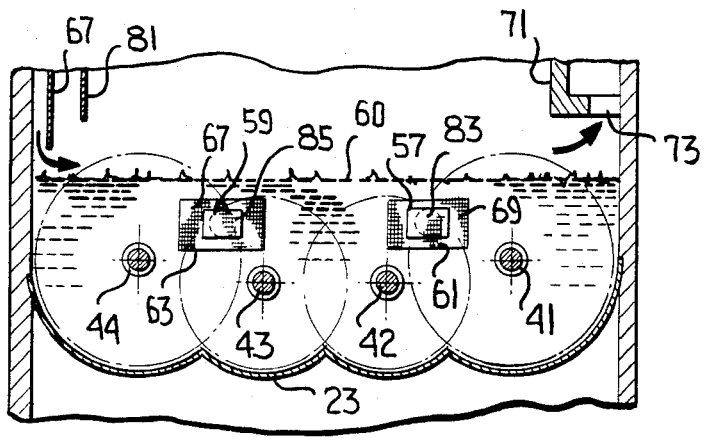
FIG. 6 is a detailed view in section taken along lines 6—6 of FIG. 3.

The egress of gas from the vessel is conducted by a duct 71 secured to side wall 13 to extend depth-wise of the unit along the top of the composting vessel 24. A slot 73 extends along the bottom of duct 71 to provide a gas ingress opening therefor. An egress slot 75 is provided in the top of duct 71 proximate the rear of the vessel. Egress slot 75 is aligned with a suitable hole in the cabinet top wall 19 to provide flow communication between duct 71 and exhaust fan housing 29, as best illustrated in FIG. 5. An exhaust fan 77 is disposed within housing 29 and is arranged to draw gas from the duct 71 and exhaust that gas through a vent pipe 79 extending from housing 29. A flow baffle plate 81 is disposed within the vessel, parallel to secondary heating plate 67 and side wall 15 at a location between the heater plate 67 and slash guard 21. The baffle plate is secured along its top edge to the undersurface of top wall 19.

Air is drawn into the vessel by exhaust fan 77 through slot 65 and flows downwardly along heater plate 67 into contact with the top surface of mixture 60. A continuous supply of oxygen is therefore assured for the aerobic decomposition process in the vessel. Gas is exhausted from the vessel through duct 71, housing 29, fan 77 and vent pipe 79. The egressing gas includes air, ammonia, and the carbon dioxide which is formed by the decomposition process.

The outside surface of the cabinet front wall 11 has a plurality of controls and indicators mounted thereon. Specifically, a control knob 83 permits adjustment of the switching threshold for moisture sensor 57. A similar adjustment for the switching threshold of moisture sensor 59 is provided in the form of knob 85. Three indicator lamps 86, 87 and 88 are provided to indicate the energization status of the secondary heater 67, primary heater 23 and motors 35–38, respectively. Manual adjustment for the thermal output from secondary heater plate 67 is provided by means of a rheostat control knob 90 disposed atop the exhaust fan housing 29. A timer switch 92, also disposed atop housing 29, permits an operator to override the primary moisture sensor 57 so as to manually apply voltage to the motors 35–38 for a selectable time interval.

The space between the vessel bottom wall 23 and cabinet bottom wall 17 is suitable for placing an exhaust fan therein. Specifically, the dry closet may be used to replace a flush toilet by placing the dry closet over the drain pipe for the flush toilet. A hole can be defined through the cabinet bottom wall 17 of a size to fit the drain pipe which can then be adapted to serve as a vent. The exhaust fan is placed in the bottom of the cabinet between the vessel bottom wall 23 and the cabinet bottom wall 17 to draw gas into the vent pipe.

Electrical connections to the unit are made at a terminal board 94 secured to the outside of the vessel rear wall 95 above the location of motors 35–38.

Figure 7:
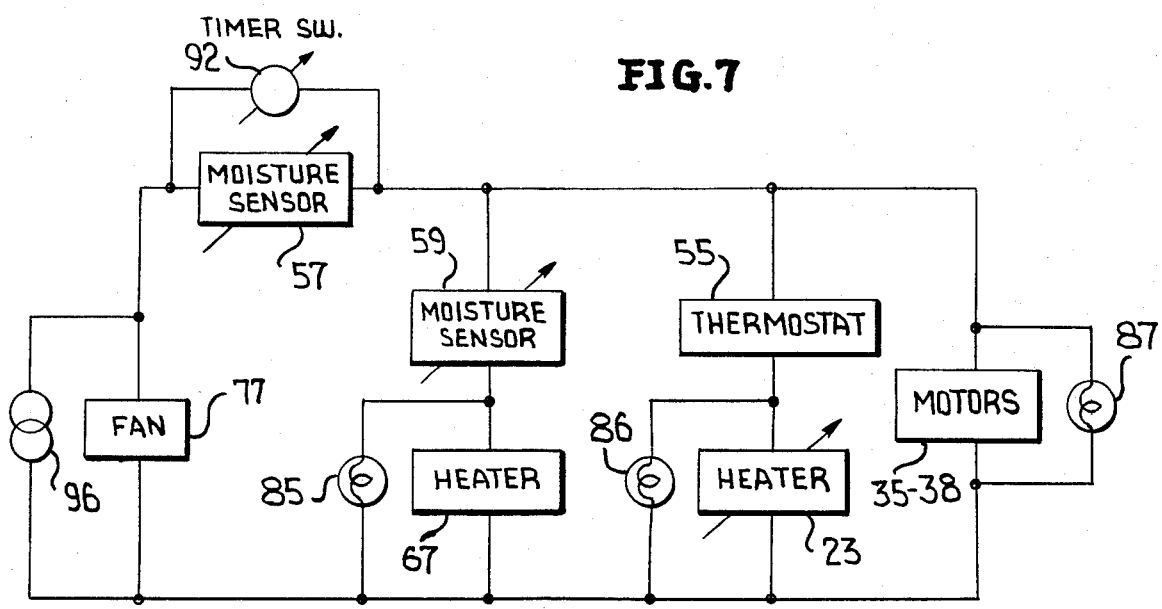
FIG. 7 is a schematic diagram of the electrical control circuit for the biological conversion toilet of FIG. 1.

Referring to FIG. 7, electrical operation of the device is illustrated by the schematic diagram in that drawing. A source 96 of primary voltage, for example, 120 volts, 60Hz convenient power, is employed to operate the unit. Exhaust fan 77 is connected directly across source 96 so that the fan operates continuously. The primary moisture sensor 57 is connected in series with the motors 35–38 across source 96, it being understood that all four motors 35–38 are connected in parallel with one another. Primary moisture sensor 57 provides a switch closure when the sensed moisture resides within a specific range. For example, whenever the moisture content of the mixture 60 rises above 60%, primary moisture sensor 57 closes the circuit for motors 35–38 to stir the mixture. When the moisture content of the mixture 60 falls below 40%, the switch in moisture sensor 57 opens and the stirring motors are de-energized. Timer switch 92 is connected in parallel with moisture sensor 57 to permit manual overriding of the moisture sensor 57 and operation of motors 35–38 for any desired period of time up to twelve hours. Indicator lamp 87 is connected in parallel with motors 35–38 and is, therefore, energized whenever the motors are mixing mixture 60.

The primary heater 23 is connected in series with thermostat 55, the series combination being connected in parallel with motors 35–38 so as to be energized under the alternative control of primary moisture sensor 57 or timer switch 92. The primary heater 23 heats the bottom of the vessel 24 to heat the mixture 60 whenever motors 35-38 are operating, but only if the temperature of the mixture, as sensed by thermostat 55, is below approximately 90° F. If the mixture temperature exceeds this level, there is no need to heat the mixture to effect efficient conversion of organic waste.

The secondary heater 67 is connected in series with the secondary moisture sensor 59, the series combination likewise being connected across motors 35-38. When secondary moisture sensor 59 detects a mixture moisture content above approximately 90%, the secondary heater plate 67 is energized to de-humidify the air being admitted to the vessel.

Indicator lamp 86 is connected in parallel with the primary heater 23 and is lit whenever that heater is operating. Indicator lamp 85 is connected in parallel with secondary heater 67 and is lit whenever that heater is operating.

Figure 8:
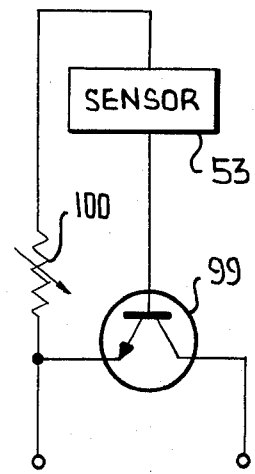
FIG. 8 is a schematic diagram of a moisture sensor arrangement which can be substituted for a moisture sensor employed in the circuit of FIG. 7.

Moisture sensors 57, 59, which are disposed in respective recesses 61, 63, may be conventional units arranged to provide switch closures at selectable threshold moisture levels. Selection of the threshold moisture level is made by means of the control knobs 83, 85 which adjust the sensing range of the sensors. When directly immersed moisture sensors 53 are employed in place of recessed sensors 57, 59, a Model 3252-S15 soil moisture meter, manufactured by Arthur H. Thomas Company, may be employed for each sensor 53. Such a sensor provides an analog signal with an amplitude proportional to the sensed moisture content of mixture 60. In order to convert this moisture level to switch closure at a desired moisture level, the sensor 53 may be connected, as illustrated in FIG. 8, in the base-emitter circuit of transistor 99 in series with an adjustable resistance 100. The collector-emitter circuit of the transistor 99 is rendered conductive or non-conductive as a function of the sensed moisture level and the setting of resistor 100.

The biological conversion toilet described hereinabove is a complete mixing aerobic composting toilet utilizing aerobic bacteria in the waste conversion process. The biological process within the toilet is dependent upon creation of the proper environment within the toilet, which environment is necessary to sustain adequate activity of micro-organisms for the purpose of breaking down organic waste within the vessel 24. This process is accomplished, as described above, by applying heat, inducing air circulation, ventilation, and mechanical stirring. Generally speaking, a toilet of the type described herein has the capability of handling and treating organic waste generated by an average family.

As noted above, the cabinet is preferably made of molded polyethylene or fiber glass. The bottom wall 23, which serves to heat the composting mixture, is preferably constructed of stainless steel. In a typical embodiment, the unit weighs approximately 65 pounds, is 26 inches in length, 19 inches in width and 20 inches in height.

It should be noted that adjacent drive shafts 41-44 rotate in opposite directions. The overlap of the mixing prongs between adjacent drive shafts assures a serpentine flow of the mixture 60 throughout the vessel with no stagnation or dead spots. Typically, the motors 35-38 are driven at a rotational speed of approximately 1⅓ revolutions per minute and have ratings of approximately 0.004 horsepower.

It should be noted that the dry closet can be adapted to employ more than one opening into the composting vessel 24 whereby a plurality of toilet seats would be provided.

While a specific embodiment of the invention has been described herein, it will be clear that variations of the details of construction which are specifically illustrated and described may be resorted to without departing from the true spirit and scope of the invention as defined in the appended claims.

What is claimed is:

1. A toilet apparatus for biologically converting organic waste material substantially entirely into carbon dioxide, ammonia, and water, said toilet apparatus comprising:

a collecting vessel having a closed bottom, said vessel being adapted to contain a bed of activating conversion material supported by said closed bottom and having a top surface at a predetermined level in said vessel;

stirrer means disposed in said vessel for stirring a mixture of said conversion material and organic waste material admitted into said vessel, said stirrer means being disposed at least partially below said predetermined level; and moisture control means for activating and de-activating said stirrer means as a function of the moisture content of said mixture, said moisture control means including a primary moisture sensor disposed in said conversion material in said vessel at a location below said predetermined height in said vessel.

2. The apparatus according to claim 1 wherein said vessel includes at least one side wall having a recess defined therein and wherein said moisture sensor is disposed in said recess.

3. The apparatus according to claims 1 or 2 wherein said recess is covered with a sheet of moisture-pervious material which is impervious to said mixture to isolate said moisture sensor from direct contact with said mixture.

4. The apparatus according to claim 1 wherein said moisture sensor includes a probe disposed directly in said mixture.

5. The apparatus according to claims 2 or 4 wherein said stirrer means comprises a plurality of rotatable shafts and drive motor means operatively connected to said shafts in a rotational drive arrangement, wherein said primary moisture sensor includes switch means which is closed when said primary moisture sensor senses moisture in said mixture above a first predetermined moisture level, wherein said drive motor means includes drive circuit means, wherein said electric switch is connected in series combination with said drive motor means and said drive circuit means, and wherein said series combination is connected across a pair of supply voltage terminals.

6. The apparatus according to claim 5 further comprising:

primary electric heater means secured to said bottom of said vessel so as to heat the bottom of the vessel when the heater means is energized; and thermostat means responsive to the temperature in said vessel falling below a predetermined temperature for connecting said primary heater means and said primary moisture sensor switch means in series across said supply voltage terminals.

7. The apparatus according to claim 6 further comprising:

an air inlet opening for admitting ambient air into said vessel;

a gas egress opening for conducting gases from said vessel to ambient;

exhaust fan means, electrically connected across said supply voltage terminals, for exhausting gases from said vessel through said egress openings;

secondary electric heater means disposed inside said vessel in the path of air admitted through said inlet opening for heating the admitted air to evaporate moisture therefrom;

a secondary moisture sensor disposed below said predetermined height in said vessel for sensing the moisture content of said mixture and including an electric switch which is closed when the mixture moisture content is above a second predetermined moisture level which is above said first predetermined moisture level; and means connecting the electric switch of said secondary moisture sensor and said secondary heater means in series with the switch means of said primary moisture sensor across said supply voltage terminals.

8. The apparatus according to claim 7 further comprising manually actuable adjustable timer switch means connected in parallel with the electrical switch of said primary moisture sensor to permit selective override of said primary moisture sensor for selectable time periods.

9. The apparatus according to claim 5 wherein said rotatable shafts extend horizontally and parallel to one another within said vessel and each shaft includes a plurality of radiallyextending prongs secured thereto, the prongs on each shaft being successively spaced longitudinally along that shaft, successively spaced prongs extending perpendicular to and at different radial angles from each shaft.

10. The apparatus according to claim 9 wherein each shaft is disposed closer to at least one other shaft than the sum of the lengths of a prong from said each shaft and a prong from said one other shaft, and wherein the longitudinal positions of prongs on said each shaft and said one shaft are mutually offset to avoid interference therebetween when the shafts are rotated.

11. The apparatus according to claim 10 wherein the angular spacing between alternate longitudinally-spaced prongs on each shaft is uniform and wherein successive prongs are spaced in opposite angular directions.

12. The apparatus according to claim 11 wherein said rotatable shafts are four in number and are disposed in parallel relation with two outermost shafts and two innermost shafts, wherein the prongs of the outermost shafts are longer than the prongs of the innermost shafts, and wherein adjacent shafts are rotatable in opposite directions.

13. The apparatus according to claim 9 wherein said rotatable shafts are four in number and are disposed in parallel relation with two outermost shafts and two innermost shafts, wherein the prongs of the outermost shafts are longer than the prongs of the innermost shafts, and wherein adjacent shafts are rotatable in opposite directions.

14. The apparatus according to claim 5 further comprising manually actuable adjustable timer switch means connected in parallel with the electrical switch of said primary moisture sensor to permit selective override of said primary moisture sensor for selectable time periods.

15. A toilet apparatus for biologically converting organic waste material substantially entirely into carbon dioxide, ammonia, and water, said toilet apparatus comprising:

a collecting vessel having a bed of activating conversion material disposed therein; and stirrer means disposed in said vessel for stirring a mixture of said conversion material and organic waste material which is admitted into said vessel;

wherein said stirrer means includes a plurality of rotatable shafts and drive means for rotating said rotatable shafts such that adjacent rotatable shafts are rotated in opposite directions;

wherein said rotatable shafts extend horizontally and parallel to one another within said vessel and each shaft includes a longitudinal axis and a plurality of prongs secured to said shaft extending radially from and perpendicular to said axis, the prongs of each shaft being successively spaced longitudinally along that shaft, successively spaced prongs extending radially at different radial angles from each shaft.

16. The apparatus according to claim 15 wherein each shaft is disposed closer to at least one other shaft than the sum of the lengths of a prong from said each shaft and a prong from said one other shaft, and wherein the longitudinal positions of prongs on said each shaft and said one shaft are mutually offset to avoid interference therebetween when the shafts are rotated.

17. The apparatus according to claims 15 or 16 wherein the angular spacing between alternate longitudinally-spaced prongs on each shaft is uniform and wherein successive prongs are spaced in opposite angular directions.

18. The apparatus according to claims 15 or 16 wherein said rotatable shafts are four in number and are disposed in parallel relation with two outermost shafts and two innermost shafts, wherein the prongs of the outermost shafts are longer than the prongs of the innermost shafts, and wherein adjacent shafts are rotatable in opposite directions.

19. The apparatus according to claim 15 wherein the prongs of each shaft are of uniform length throughout that shaft but differ in length from the prongs of an adjacent shaft.

20. The apparatus according to claim 15 wherein said drive means comprises a plurality of motors, each rotatably driving a respective shaft.

21. A toilet apparatus for biologically converting organic waste material substantially entirely into carbon dioxide, ammonia, and water, said toilet apparatus comprising:

a collecting vessel having a closed bottom, an air inlet opening and an air outlet opening, said vessel being adapted to contain a bed of activating conversion material supported on said closed bottom;

actuable stirrer means disposed in said vessel for stirring a mixture of said conversion material and organic waste material which is admitted into said vessel;

exhaust means for establishing a gas flow between said inlet and outlet openings and in contact with said mixture;

selectively actuable heater means disposed adjacent said inlet opening for heating air admitted through said inlet opening when said heater means is energized, thereby evaporating moisture in said admitted air; and moisture control means responsive to the moisture content of said mixture exceeding a predetermined level for energizing said heater means.

22. The apparatus according to claim 21 wherein said moisture control means includes a moisture sensing probe immersed in said mixture.

23. The apparatus according to claim 21 or 22 further comprising moisture sensing means responsive to the moisture content of said mixture falling below a prescribed level which is below said predetermined level for de-actuating said stirrer means.

24. The apparatus according to claim 23 wherein said moisture sensing means includes a moisture sensing probe immersed in said mixture.

25. The apparatus according to claim 23 wherein said moisture sensing means includes a moisture sensing probe disposed in said vessel at a depth below the surface of said mixture.

* * * * *